July 31, 1956 K. P. HILLEGASS 2,756,848
CONICAL COIL SPRING BRAKE LINING RETENTION DEVICE
Filed Jan. 18, 1955
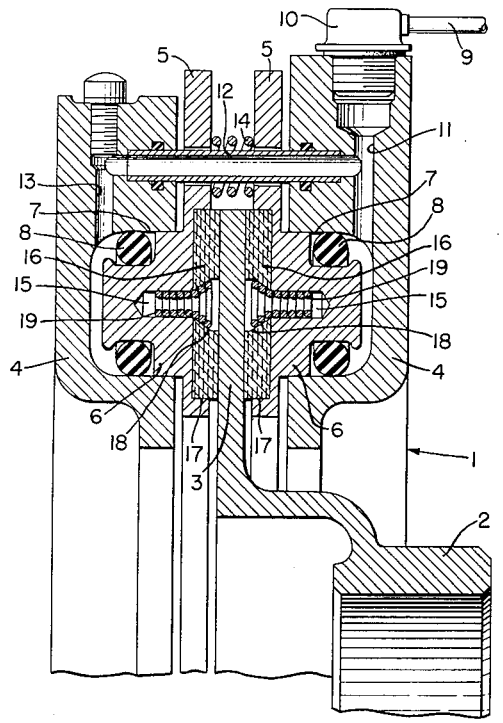
FIG. 1
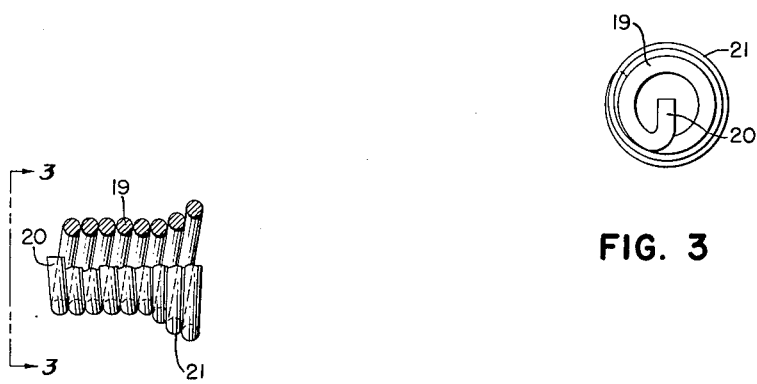
FIG. 2
FIG. 3
INVENTOR.
KENNETH P. HILLEGASS
BY
*R. L. Miller*
ATTORNEY

United States Patent Office 2,756,848
Patented July 31, 1956

2,756,848

CONICAL COIL SPRING BRAKE LINING RETENTION DEVICE

Kenneth P. Hillegass, Akron, Ohio, assignor to Goodyear Aircraft Corporation, Akron, Ohio, a corporation of Delaware Application January 18, 1955, Serial No. 482,568

5 Claims. (Cl. 188—234)

This invention relates to brake lining retention or positioning means, and it especially is concerned with the use of resilient members, such as coil springs, for securing brake lining to supporting or positioning means.

Heretofore, many efforts have been made to provide means for effectively securing brake linings to positioning means. One difficulty in securing brake linings in place is that the brake, brake lining support member, and brake itself are all subjected to severe and repeated vibrations, torques and other stresses when in use. For best action, the brake linings must obviously be securely positioned on their carrier means, at all times. It also is very important that the brake lining positioning means permit the removal of the brake lining when it becomes worn and the ready re-attachment of a new brake lining for the one being replaced.

One novel approach to the problem of effectively securing brake linings to carrier members has been by the use of a coil spring, such as is disclosed in and covered by a co-pending patent application Serial Number 381,296, filed September 9, 1953, by Hurl Lawry and Valentin E. Puse. However, insofar as I am aware, none of such previous efforts to position the brake linings on carrier members has been completely satisfactory in that it has not been easy to install and remove the brake lining with relation to a carrier member, or the positioning means may not be adapted to withstand vibration with no resultant loosing thereof, or the positioning means have not been completely satisfactory for other reasons.

The general object of the present invention is to provide a new and improved brake lining positioning device comprising a coil spring having one end of a conical shape for seating in a counterbored hole provided in a brake lining member and having a tang extending across the other end of the brake lining positioning spring to facilitate inserting the spring into a brake assembly.

Another object of the invention is to use a coil spring in compression engagement with a receiving hole in one member and in wedged engagement with a second member to secure such members together.

Another object of the invention is to provide a coil spring member that is easily installed in a brake, and also can be readily removed therefrom when it is desired to change or inspect the brake lining means.

Another object of the invention is to provide a coil spring used for positioning a brake lining to permit slight movement of the brake lining so that braking forces will not be carried by the spring device.

Yet another object of the invention is to provide a device of the class referred to which is inexpensive to produce and effective in operation.

The foregoing and other objects and advantages of the invention will be made more apparent as the specification proceeds.

For a better understanding of this invention, reference should be had to the accompanying drawings, wherein:

Fig. 1 is a fragmentary vertical section through a brake assembly using the conical coil spring lining retention device of the invention and embodying the principles thereof;

Fig. 2 is an enlarged elevation of the conical coil spring of the invention; and Fig. 3 is a side elevation of the spring of Fig. 2 taken on line 3—3 thereof.

It should be understood that the present invention illustrates one embodiment of a coil spring lining retention device of the invention positioned in one operative brake assembly but that any desired type of brake means can be used in association with the device of the invention.

When referring to corresponding parts in the drawing and specification, corresponding numerals are used to facilitate comparison between such parts.

The invention in general relates to the combination in a brake of a brake lining holding member, a brake lining member, which members have abutted inner faces with aligned holes provided therein and with the holes in one of the members being counterbored from the outer face or surface of such member, and coil spring means in compression engagement with the holes in the second of said members and extending between the members to secure the members together. The coil spring means have conical portions at one end thereof seated in the counterbores of the one set of holes in the said one member to aid in securing the members together. The coil spring means having hollow centers and have tangs extending into such hollow centers to facilitate grasping the spring by a tool inserted into the coil spring means.

Reference now should be had to the details of the structure shown in the accompanying drawings, and a brake is indicated as a whole by the numeral 1. The brake 1 as illustrated herein includes a hub 2 which can be secured in any conventional manner with or to suitable shaft means (not shown) and with the hub 2 supporting a brake disc 3 thereon, which brake disc 3 is shown as formed integrally with the hub 2 and offset therefrom. A circumferentially split brake housing 4 is provided in the brake 1 and this brake housing 4 is suitably secured in a fixed position by conventional means (not shown).

The brake 1 includes a pair of brake block positioning members or rings 5 with such brake positioning members 5 each having an annular piston 6 positioned in one face thereof and extending axially therefrom in opposed relation, as indicated in Fig. 1 of the drawings. These pistons 6 are received in annular chambers 7 provided in the housings 4, the pistons 6 being sealed in the chambers 7 by conventional O-rings 8, as indicated.

Thus hydraulic means or fluid is supplied to the brake 1 through the conventional tube or conduit 9 connecting to a fitting 10 engaged with the brake housing 4. The housing 4 has a bore 11 therein connecting the fitting 10 to one of the chambers 7 provided therein whereas a connector tube 12 extends from the bore 11 to a similar bore 13 provided in another portion of the housing 4 for transmission of hydraulic pressure fluid to the other chamber 7 provided in the brake housing. Hence when pressure is supplied through the tube 12, the pistons 6 both are forced axially in the brake 1 towards the brake disc 3 for effecting braking action thereon, as hereinafter described in more detail. Suitable springs 14 are compressed intermediate the pair of brake positioning members 5 and are maintained in engagement therewith for urging such members axially apart when no pressure is exerted thereon through the chambers 7 and hydraulic fluid received therein.

As an important feature of the invention, each of the brake positioning members is provided with a plurality of cylindrical holes 15. These holes 15 extend into but not through the brake positioning members from the inner faces thereof. Conventional spot type brake lining discs or blocks 16 are provided and seat in counterbores 17 in the brake positioning members 5 for effecting the actual braking action upon the brake disc 3. Each brake lining block 16 is provided with a hole 18 extending therethrough, which holes 18 are at least substantially aligned with the holes 15 in the brake positioning members 5 when the blocks 16 are seated in the counterbores 17, as shown in the drawings. A further feature of the brake lining means is that the holes 18 are counterbored from the inner or adjacent faces thereof to provide conical shaped walls for at least a portion of the length of the holes.

A plurality of coil springs 19 are provided for securing the brake lining blocks 16 to the brake lining positioning members 5 and with such coil springs 19 normally having longitudinally abutted convolutions provided therein. As important features of the present invention, each of the springs 19 is provided with a tang 20 at one end thereof, which tang extends substantially radially of the coil spring on which it is positioned into the hollow center thereof, and with a conical shape at the opposite end 21 thereof. These conical shaped ends 21 are made at least substantially complementary to the counterbores provided in the holes 18. Thus in assembling the springs 19 in the remainder of the brake means, a suitable tool (not shown) can be inserted through the hollow center portion of any of the springs 19 and engage the tang 20 so that the spring 19 can be forced into one of the holes 15 provided in one of the brake lining positioning members 5. It should be noted particularly that these springs 19 do not extend to the bottom of the holes 15 but are spaced therefrom so that the tool used for inserting the springs into the hole can be readily disengaged therefrom. It will be realized that the convolutions of the springs 19 are radially compressed slightly as the coil springs are forced into such receiving holes. The positioning action of the tool exerted upon the tang 20 of the spring also serves to draw the conical shaped end 21 tightly against the counterbored hole receiving such spring end so that the spring 19 will effectively and slightly resiliently secure the brake lining block 16 on the brake lining positioning members 5. The counterbores 17 snugly receive the blocks 16 to take the braking forces applied thereto, as slight movement of the blocks 16 is permitted by the coil springs 19. When the brake lining becomes worn, the springs 19 can readily be withdrawn and new brake lining means can be secured to the brake lining positioning members 5.

Any desired number of the brake lining blocks 16 are provided in the brake 1. In general, the coil springs 19 used in the brake 1 are of the same general type in construction and operation as disclosed in and covered by the co-pending patent application referred to hereinbefore.

From the foregoing, it is submitted that a relatively simple, uncomplicated means has been provided for effectively securing a brake lining member onto a carrier plate, or member for effective braking action. These brake lining positioning means will not loosen by excessive vibration and will provide a desirable solid positioning of the brake lining means over a long service life with a minimum of maintenance. Hence it is contended that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In a brake, a brake lining positioning member having cylindrical holes extending thereinto from one face thereof, brake lining means having counterbored holes extending therethrough and positioned correspondingly to said first named holes, faces of said brake lining positioning member and brake lining means being abutted with corresponding holes therein being aligned, and longitudinally solid coil springs having normal outer diameters slightly larger than the diameters of said holes in said brake lining positioning member engaged therewith with the springs in radially compressed condition and extending into said counterbored holes to secure said brake lining means with slight resiliency to said brake lining positioning member, said coil springs each having a tang extending substantially radially thereof at one end thereof for engaging a tool used to position said coil spring into one of said holes and having an enlarged conical head portion at the other end thereof engaged with one of said counterbored holes.

2. In a brake, a brake lining positioning member having cylindrical holes extending thereinto from one face thereof, brake lining means having cylindrical holes extending therethrough from one inner face thereof, the said faces of said brake lining positioning member and brake lining means being abutted with corresponding holes therein being aligned, and coil springs having normal outer diameters slightly larger than the diameters of said holes in said brake lining positioning member engaged therewith but extending thereinto a distance shorter than the depth of the holes with the springs in radially compressed condition, said coil springs also engaging the holes in said brake lining means, said coil springs each having a tang extending substantially radially thereof at one end thereof for engaging a tool used to position said coil spring into said holes in said brake lining positioning means.

3. A brake as in claim 2 wherein said coil springs have conical shaped ends and the outer ends of said holes in said brake lining means are conically counterbored to receive said conical shaped spring ends and engage therewith by a wedge fit.

4. In combination in a brake, a brake lining holding member, a brake lining member, said members having abutted inner faces with aligned holes provided therein, the holes in one of said members being conically counterbored from the outer face of such member, and coil spring means in radially compressed engagement with said holes and extending between said members to secure said members together, said coil spring means having a conical enlarged portion at one end thereof seated in said conical counterbores to aid in securing said members together.

5. In combination in a brake, a brake lining holding member, a brake lining member, said members having abutted inner faces with aligned holes provided therein, the holes in one of said members being counterbored from the outer face of such member, and coil spring means in radially compressed engagement with said holes and extending between said members to secure said members together, said coil spring means having a conical enlarged portion at one end thereof seated in said counterbores to aid in securing said members together, said coil spring means having hollow centered cylindrical portions at their other ends with a tang extending into such hollow centers.

References Cited in the file of this patent

UNITED STATES PATENTS

| 380,184 | Celce | Mar. 27, 1888 |
| 1,462,925 | Wilburger | July 24, 1923 |
| 1,771,595 | Thompson | July 29, 1930 |
| 1,896,453 | Loughead | Feb. 7, 1933 |
| 2,682,320 | Chamberlain | June 29, 1954 |

FOREIGN PATENTS

| 572,218 | Great Britain | Sept. 27, 1945 |